United States Patent
Plattner

(10) Patent No.: US 7,273,237 B1
(45) Date of Patent: Sep. 25, 2007

(54) UNION COUPLER ASSEMBLY FOR COOLANT LINES

(76) Inventor: Wesley M. Plattner, 1146 Breyman Hwy., Tipton, MI (US) 48287

( * ) Notice: Subject to any disclaimer, the term of this patent is extended or adjusted under 35 U.S.C. 154(b) by 72 days.

(21) Appl. No.: 11/052,482

(22) Filed: Feb. 4, 2005

(51) Int. Cl.
F16L 37/00 (2006.01)

(52) U.S. Cl. .................. 285/321; 285/369; 285/307; 285/308

(58) Field of Classification Search .......... 285/369, 285/307, 308, 321
See application file for complete search history.

(56) References Cited

U.S. PATENT DOCUMENTS

| | | | | |
|---|---|---|---|---|
| 2,182,797 A | * | 12/1939 | Dillon | 285/308 |
| 3,151,891 A | * | 10/1964 | Sanders | 285/110 |
| 4,087,120 A | * | 5/1978 | Rumble | 285/39 |
| 4,138,146 A | * | 2/1979 | Rumble | 285/39 |
| 4,822,203 A | * | 4/1989 | Walmsley | 285/412 |
| 5,671,955 A | | 9/1997 | Shumway | |
| 5,683,116 A | * | 11/1997 | Folkers | 285/18 |
| 5,709,415 A | * | 1/1998 | Witter | 285/304 |
| 5,876,071 A | | 3/1999 | Aldridge | |
| 5,979,946 A | | 11/1999 | Petersen et al. | |
| 6,102,447 A | | 8/2000 | Aldridge | |
| 6,592,151 B2 | | 7/2003 | Densel et al. | |
| 2003/0116965 A1 | | 6/2003 | Hsu | |
| 2004/0124635 A1 | | 7/2004 | Hall | |
| 2004/0178630 A1 | | 9/2004 | Davidson | |

* cited by examiner

*Primary Examiner*—David Bochna
(74) *Attorney, Agent, or Firm*—Young Basile

(57) ABSTRACT

A union coupler assembly for coolant lines comprising a coupler body, a first coolant line end portion, and a second coolant line end portion. The coupler body has a passageway extending between first and second ends, two tapered annular grooves, a snap ring disposed within each tapered annular groove, and a plurality of o-rings seated in corresponding annular grooves. The coolant line end portions are fabricated from metal and have tapered ends and grooves formed in their outer surfaces. The coolant line end portions are movable between an engaged position, wherein the snap rings engage the grooves in the coolant line end portions, and a disengaged position, wherein the snap rings do not engage the grooves in the coolant line end portions. When the coolant line end portions are in the engaged position, the tapered end of the first coolant line end portion abuts the tapered end of the second coolant line end portion to prevent inward movement of the coolant line end portions, and at least one o-ring seals each coolant line end portion with respect to the coupler body.

14 Claims, 2 Drawing Sheets

UNION COUPLER ASSEMBLY FOR COOLANT LINES

FIELD OF THE INVENTION

The present invention relates to the field of union coupler assemblies, and more particularly, the present invention relates to a union coupler assembly for connecting a pair of air conditioning coolant lines having a coupler body that sealingly couples a first coolant line and a second coolant line.

BACKGROUND OF THE INVENTION

Connecting air conditioning lines on aircraft poses significant difficulty. Air conditioning coolant lines on aircraft are typically fabricated from copper or aluminum piping. Due to the risk of fire or explosion, the copper or aluminum piping cannot be welded while performing maintenance on an aircraft. Although flares or fittings are useful for similar applications, they have proven ineffective for aircraft cooling systems due to the leaking of such flares and fittings caused by the small molecules formed in the coolant.

Past coupler designs have been produced to connect two fluid filled lines wherein a contractible ring is seated in a circumferentially tapered channel of the coupler body. These designs employ a circumferentially tapered channel having its smallest diameter at the open end of the coupler body. Under tensile loading, such a coupler body exerts purely radial force upon the fluid filled line retained in the coupler. These radial forces may cause deformation of the coupler or the pipe, thereby causing the pipe to separate from the coupler. When compressive forces are exerted on the coupler by the fluid filled line, the contractible ring may also travel inward past the circumferentially tapered channel, causing the fluid filled line to become stuck in the coupler.

It would be desirable to provide a simple, inexpensive coupler that allowed for the sealed attachment of a pair of coolant lines in an aircraft without the risk of fire or explosion, while at the same time preventing accidental separation, over-insertion, and leaking of the coolant lines.

BRIEF SUMMARY OF THE INVENTION

The present invention provides a union coupler assembly that allows sealed engagement of two air conditioning system coolant lines. A coupler body is provided that has a passageway extending between a first end and a second end. First and second tapered annular grooves are formed in the coupler body, and first and second snap rings are at least partially disposed in the first and second tapered annular grooves, respectively. Each snap ring is movable from the inner end of the first or second tapered annular groove to the outer end of the first or second tapered annular groove. Each snap ring is fully disposed within the tapered annular groove at the inner end of the corresponding tapered annular groove, and each snap ring is at least partially disposed within the passageway at the outer end of the corresponding tapered annular groove.

The first and second coolant line end portions are formed of metal, and each coolant line end portion has a tapered end and a groove formed in its outer surface for receiving a snap ring. The first and second coolant line end portions are movable between an engaged position, wherein one of the first and second snap rings engages the groove in one of the first or second coolant line end portions, and the other snap ring engages the groove in the other coolant line end portion, and a disengaged position, wherein neither of the snap rings engage the groove in the first or second coolant line end portion. When the first and second coolant line end portions are in the engaged position, the tapered ends of the first and second coolant line end portions abut one another, thereby preventing inward movement of the first and second coolant line end portions. At least one of a plurality of o-rings seals the first coolant line end portion with the coupler body in the engaged position, and at least one of a plurality of o-rings seals the second coolant line end portion with respect to the coupler body in the engaged position.

BRIEF DESCRIPTION OF THE DRAWINGS

The description herein makes reference to the accompanying drawings, wherein like-referenced numerals refer to like parts throughout several views and wherein.

DETAILED DESCRIPTION OF THE INVENTION

Figure 1:
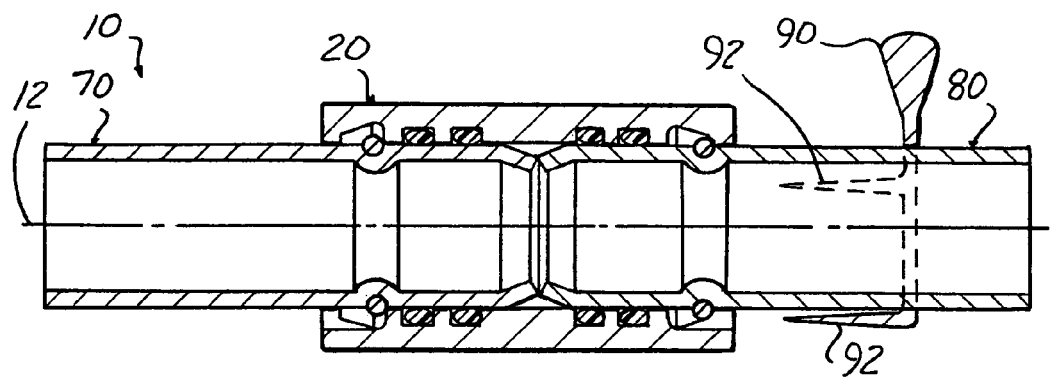
FIG. 1 is a sectional view of the union coupler assembly of the present invention.

Referring to the drawings, the present invention will now be described in detail with reference to the preferred embodiment.

FIG. 1 shows the union coupler assembly 10 of the present invention. The union coupler assembly 10 provides a coupler body 20 that sealingly enables fluid communication between coolant lines of an air conditioning system (not shown) on an aircraft (not shown). Although the present invention is ideally suited for aircraft, the present invention is not limited to aircraft, but rather, the present invention may be utilized to couple any air conditioning lines for any system. A first coolant line end portion 70 and a second coolant line end portion 80 of the air conditioning coolant lines have an engaged position, wherein the first and second coolant line end portions 70, 80 are held in sealed engagement with the coupler body 20 so that fluid, such as air conditioning coolant, may flow between the first and second coolant line end portions 70, 80, and a disengaged position, wherein fluid may not flow between the first and second coolant line end portions 70, 80. Snap rings 34, 46 are utilized to secure the first and second coolant line end portions 70, 80 in the engaged position. A tool 90 is provided to disengage the snap rings 34, 46 so that the first and second coolant line end portions 70, 80 may move from the engaged position toward the disengaged position.

Figure 2:
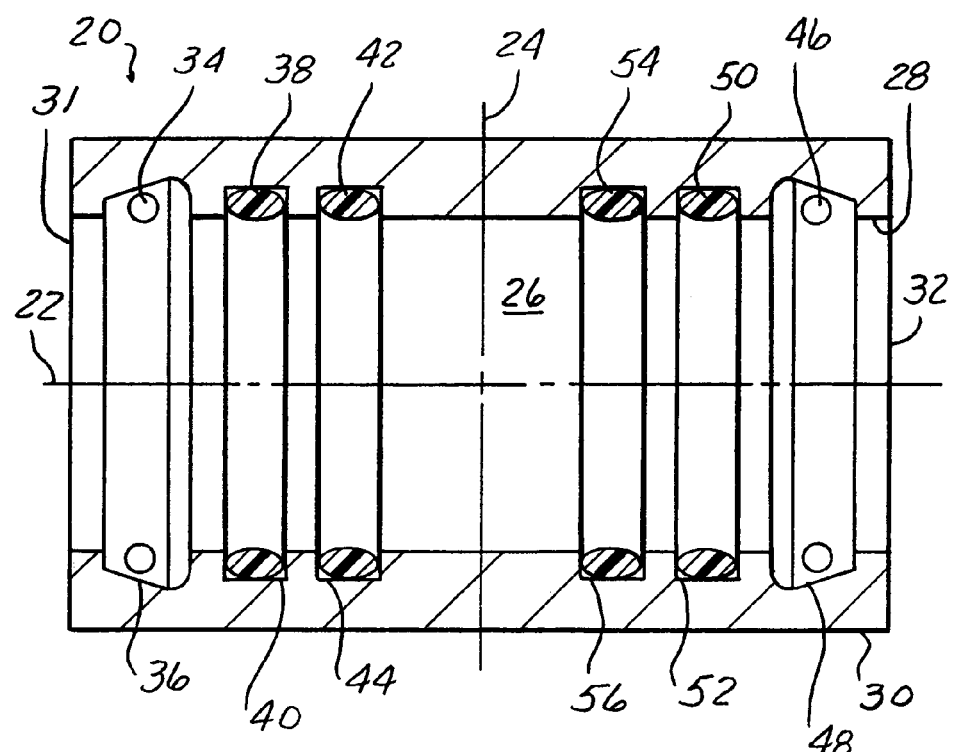
FIG. 2 is a sectional view of the coupler body of the union coupler assembly of the present invention.
Figure 4:
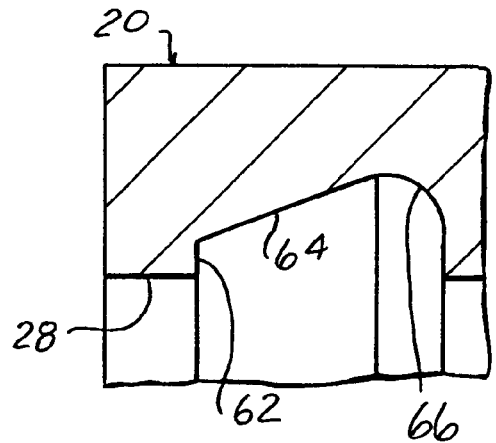
FIG. 4 is a sectional view of the first and second tapered annular slots of the coupler body of the union coupler assembly of the present invention.

In order to receive the first and second coolant line end portions 70, 80, the coupler body 20 is hollow and substantially cylindrical in shape, having an inner periphery 28, an outer periphery 30, a first end 31 and a second end 32, as seen in FIG. 2. The inner periphery 28 of the coupler body 20 defines the outer boundary of a passageway 26 that extends through the coupler body 20 along its longitudinal axis 22. The coupler body 20 is symmetrical about a plane lying perpendicular to the longitudinal axis 22 at a central point 24 of the coupler body 20 such that the first coolant line end portion 70 and the second coolant line end portion 80 may be received in the passageway 26 at opposite ends of the coupler body 20. According to the symmetrical construction of the coupler body 20, identical structures are provided at each end of the coupler body 20 to seal and retain the first and second coolant line end portions 70, 80 within the coupler body 20. To retain the first coolant line end portion 70 and the second coolant line end portion 80 within the coupler body 20, a snap ring 34, 46 is disposed within a first tapered annular groove 36 and a second tapered annular groove 48, respectively. The first tapered annular groove 36 is located inward of the first end 31 of the coupler body 20, and the second tapered annular groove 48 is located inward of the second end 32 of the coupler body 20. As shown in FIGS. 1, 2, 4, outer walls 62 of the first and second tapered annular grooves 36, 48 may engage the snap ring 34, 46 to prevent the snap ring 34, 46 from traveling out of the coupler body 20. The outer walls 62 are spaced apart from each end of the coupler body 20 and extend perpendicular to the longitudinal axis 22 of the coupler body 20 wherein each outer wall 62 reaches an adjacent tapered wall 64. The tapered walls 64 of the first and second tapered annular grooves 36, 48 extend inward with respect to the coupler body 20 from the outer wall 62 to an inner wall 66. Each tapered annular groove 36, 48 has an outer diameter near the intersection of the tapered wall 64 and the outer wall 62, and a larger, inner diameter near the intersection of the tapered wall 64 and the inner wall 66. The outer diameter is the smallest diameter of each tapered annular groove 36, 48, while the inner diameter is the largest diameter of each tapered annular groove 36, 48. The inner wall 66 of each tapered annular groove 36, 48 extends radially from the tapered wall 64 and then transitions to a substantially flat portion of the inner wall 66 that lies substantially perpendicular to the longitudinal axis 22 of the coupler body 20. The perpendicular portion of each inner wall 66 may engage the snap ring 34, 46 to prevent the snap ring 34, 46 from traveling inward past the tapered annular groove 36, 48 when pressure is applied to the first and second coolant line end portions 70, 80 along their longitudinal axes 72, 82.

The coupler body 20 is able to selectively retain and release the first and second coolant line end portions 70, 80 because of the cooperative sizes of the snap rings 34, 46 and the tapered annular grooves 36, 48. The snap rings 34, 46 have an inner diameter and an outer diameter, and due to the compressible nature of the snap rings 34, 46, both the inner and outer diameters of the snap rings 34, 46 are variable. Since the snap rings 34, 46 are seated in the first and second tapered annular grooves 36, 48, the outer diameter of each snap ring 34, 46 is constrained by the diameter of the tapered annular groove 36, 48 in which it is seated. It follows that the inner and outer diameters of each snap ring 34, 46 will vary depending upon its location within the first or second tapered annular groove 36, 48. To prevent inadvertent separation of the coupler body 20 and either of the first or second coolant line end portions 70, 80, the inner diameter of the snap rings 34, 46 is smaller than the diameter of the passageway 26 when the snap rings 34, 46 are adjacent to the outer walls 62 of the tapered annular grooves 36, 48. To allow removal of either of the first or second coolant line end portions 70, 80 from the coupler body 20, the snap rings 34, 46 may be expanded with the tool 90 so that the inner diameter of the snap rings 34, 46 is equal to or larger than the diameter of the passageway 26 when the snap rings 34, 46 are adjacent to the inner walls 66 of the tapered annular grooves 36, 48. This prevents the snap rings 34, 46 from engaging the grooves 74, 84 in the first and second coolant line end portions 70, 80.

Due to the small molecules formed in coolant, four o-rings 38, 42, 50, 54 are disposed within the coupler body 20 for the purpose of sealing each of the coolant line end portions 70, 80 with respect to the coupler body 20. Two o-rings 38, 42 seal the interface between the coupler body 20 and the first coolant line end portion 70, and two o-rings 50, 54 seal the interface between the coupler body 20 and the second coolant line end portion 80. Each of the o-rings 38, 42, 50, 54 is seated in an annular groove 40, 44, 52, 56. On each end of the coupler body 20, a first annular groove 40, 52 is formed in the inner periphery 28 of the coupler body 20 inward of each tapered annular groove 36, 48. Similarly, a second annular groove 44, 56 is located inward of each first annular groove 40, 52.

Figure 5:
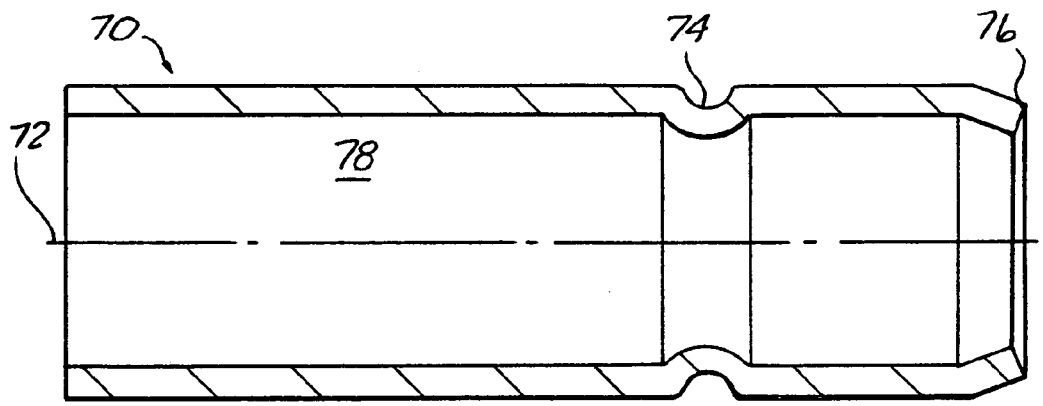
FIG. 5 is a sectional view of the first coolant line end portion of the union coupler assembly of the present invention.
Figure 6:
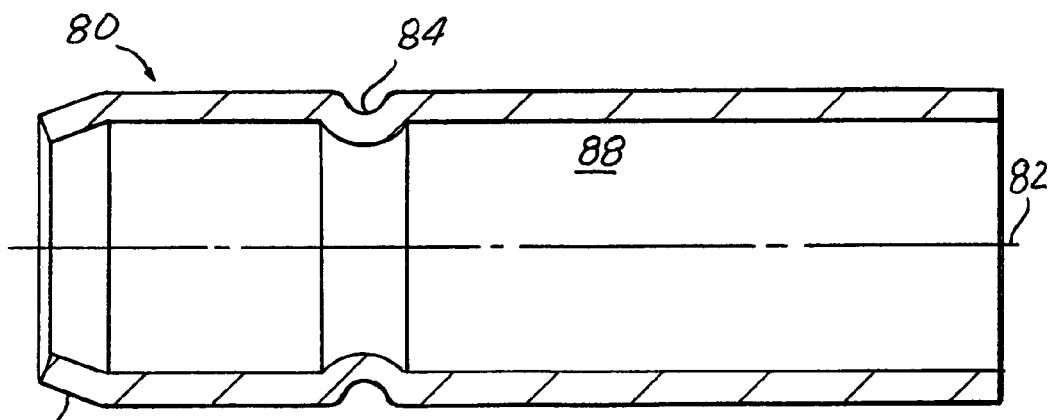
FIG. 6 is a sectional view of the second coolant line end portion of the union coupler assembly of the present invention.

The first and second coolant line end portions 70, 80 are adapted to be received in the coupler body 20. As shown in FIG. 5 and FIG. 6, both the first and second coolant line end portions 70, 80 are substantially tubular and have a passageway 78, 88 extending internally along a longitudinal axis 72, 82 of each coolant line end portion 70, 80. So that each of the coolant line end portions 70, 80 is securely retained in the coupler body 20, the grooves 74, 84 are formed on the outside of each coolant line end portion 70, 80 to engage one of the snap rings 34, 46 disposed within the coupler body 20. A taper 76, 86 is formed at the end of each of the coolant line end portions 70, 80 such that the coolant line end portions 70, 80 may enter the passageway 26 without dislodging or damaging the snap rings 34, 46 or the o-rings 38, 42, 50, 54. Consistent with their usage in aircraft air conditioning systems, the first and second coolant line end portions 70, 80 are fabricated from a metallic material, such as aluminum or copper.

To connect the first coolant line end portion 70 and the second coolant line end portion 80, the tapered end 76 of the first coolant line end portion 70 is presented to an end of the coupler body 20 such that the longitudinal axis 72 of the first coolant line end portion 70 is substantially aligned with the longitudinal axis 22 of the coupler body 20. As the first coolant line end portion 70 enters the coupler body 20, the tapered end 76 allows the first coolant line end portion 70 to pass through the snap ring 34 and the o-rings 38, 42 without damaging or unseating them. It will be understood that the snap ring 34 expands to conform to the external diameter of the first coolant line end portion 70 and consequently applies a compressive force to the exterior of the first coolant line end portion 70 at every point of contact between the snap ring 34 and the first coolant line end portion 70. As the first coolant line end portion 70 slides into the coupler body 20, the snap ring 34 is restrained by the inner wall 66 of the tapered annular groove 36 such that the snap ring 34 slides along the exterior of the first coolant line end portion 70 until the snap ring 34 reaches the groove 74 formed in the exterior of the first coolant line end portion 70. When the snap ring 34 reaches the groove 74, the snap ring 34 contracts to conform to the diameter of the groove 74. The snap ring 34 continues to apply a compressive force to the exterior of the first coolant line end portion 70 while the snap ring 34 is in the groove 74, thereby retaining the snap ring 34 in the groove 74. Further travel of the first coolant line end portion 70 into the coupler body 20 is restrained by the engagement of the snap ring 34 with the inner wall 66 of the tapered annular groove 36. However, before the second coolant line end portion 80 is inserted into the coupler body 20, the application of a compressive force to the first coolant line end portion 70 could cause the snap ring 34 to dislodge from the groove 74, resulting in over-insertion of the first coolant line end portion 70.

The second coolant line end portion 80 is inserted into the coupler body 20 in the same manner that the first coolant line end portion 70 is inserted into the coupler body 20. However, once the second coolant line end portion 80 is in the engaged position, over insertion of the first and second coolant line end portions 70, 80 is prevented by abutment of the tapered end 76 of the first coolant line end portion 70 and the tapered end 86 of the second coolant line end portion 80. When a compressive force is applied to the coupler body 20 by both the first coolant line end portion 70 and the second coolant line end portion 80, the tapered end 76 of the first coolant line end portion 70 abuts the tapered end 86 of the second coolant line end portion 80 in proximity to the central point 24 of the coupler body 20. When the tapered ends 76, 86 of the first and second coolant line end portions 70, 80 are in contact, forces are transmitted directly through the coolant lines, thereby minimizing the stresses exerted upon the coupler body 20, and preventing over insertion of the coolant line end portions 70, 80 into the coupler body 20.

The first and second coolant line end portions 70, 80 are retained in the coupler body 20 by the engagement of each snap ring 34, 46 with the tapered annular grooves 36, 48 and with the corresponding groove 74, 84 in each of the coolant line end portions 70, 80. For example, while the snap ring 34 is seated in the groove 74 in the first coolant line end portion 70, the first coolant line end portion 70 is restrained against removal from the coupler body 20 by the engagement of the snap ring 34 with the tapered portion 64 and the outer wall 62 of the first tapered annular groove 36.

Figure 3:
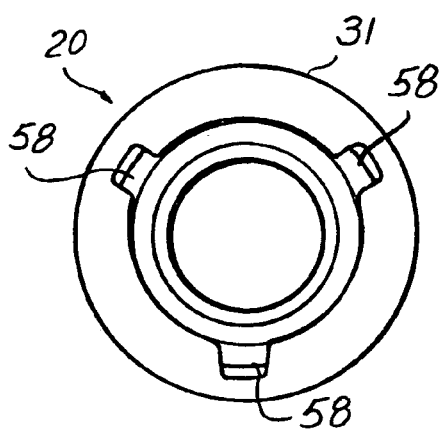
FIG. 3 is an end view of the coupler body of the union coupler assembly of the present invention.

In order to release the coolant line end portions 70, 80 from the coupler body 20, the snap rings 34, 46 must be removed from the grooves 74, 84 in the coolant line end portions 70, 80. As shown in FIG. 3, three longitudinal channels or slots 58 are formed in each end of the coupler body 20 so that a tool 90 may be used to release the snap rings 34, 46. The longitudinal channels 58 are formed in the inner periphery 28 of the coupler body 20 and extend in a direction substantially parallel to the longitudinal axis 22 of the coupler body 20. Each longitudinal channel 58 extends from either of the first end 31 or the second end 32 of the coupler body 20 to the tapered annular groove 36, 48 adjacent to that end of the coupler body 20. The tool 90 may have three tines 92 that simultaneously enter each of the three longitudinal channels 58 on either of the first end 31 or the second end 32 of the coupler body 20 and engage the corresponding snap ring 34, 46 to dislodge it from the groove 74, 84 in the coolant line end portion 70, 80. Once the snap ring 34, 46 is dislodged from the groove 74, 84, the coolant line end portion 70, 80 may be removed from the coupler body 20.

In use, the first and second coolant line end portions 70, 80 of the union coupler assembly 10 may be moved from their disengaged positions to their engaged positions by first inserting the first coolant line end portion 70 into one end of the passageway 26 of the coupler body 20. The first coolant line end portion 70 is then slid further into the coupler body 20 until the snap ring 34 is seated in the groove 74. When the snap ring 34 is seated in the groove 74, the first coolant line end portion 70 is sealed with respect to the coupler body 20 by two o-rings 38, 42. The second coolant line end portion 80 is then inserted into the opposite end of the coupler body 20 until the snap ring 46 is seated in the groove 84. When the snap ring 46 is seated in the groove 84, the second coolant line end portion 80 is sealed with respect to the coupler body 20 by two o-rings 50, 54. The tapered end 76 of the first coolant line end portion 70 may now abut the tapered end 86 of the second coolant line end portion 80. The first and second coolant line end portions 70, 80 are in their engaged positions, and fluid may flow between the first and second coolant line end portions 70, 80.

To return the first and second coolant line end portions 70, 80 to their disengaged positions, the tool 90 is inserted into the slots 58 and is used to unseat the snap ring 34 from the grooves 74 in the first coolant line end portion 70. The first coolant line end portion 70 is then removed from the coupler body 20. The tool 90 is then inserted into the slots 58 and is used to unseat the snap ring 46 from the grooves 84 in the second coolant line end portion 80. The second coolant line end portion 80 is then removed from the coupler body 20, thereby returning the first and second coolant line end portions 70, 80 to their disengaged positions.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims. The scope is to be accorded the broadest interpretation so as to encompass all such modifications and equivalent structures as is permitted under the law.

What is claimed is:

1. A union coupler assembly comprising:
   a coupler body having a first end and a second end wherein a passageway extends between said first end and said second end;
   first and second tapered annular grooves formed in said coupler body;
   first and second snap rings at least partially disposed within each of said first and second tapered annular grooves, respectively;
   a first coolant line end portion having an annular groove formed therein for receiving one of said snap rings, and said first coolant line end portion having a tapered end;
   a second coolant line end portion having an annular groove formed therein for receiving the other of said snap rings, and said second coolant line end portion having a tapered end;
   said first and second coolant line end portions movable between an engaged position, wherein one of said first and second snap rings engages said groove in said first or second coolant line end portion and the other of said first and second snap rings engages said groove in the other of said first or second coolant line end portion, and a disengaged position, wherein neither of said snap rings engages said groove in said first or second coolant line end portion; and
   said tapered end of said first coolant line end portion abutting said tapered end of said second coolant line end portion when said first coolant line end portion and said second coolant line end portion are in said engaged position to prevent inward movement of said first coolant line end portion and said second coolant line end portion.

2. A union coupler assembly comprising:
   a substantially tubular coupler body having an inner periphery, a longitudinal axis, and a passageway extending between a first end of said coupler body and a second end of said coupler body;

first and second tapered annular grooves formed in said inner periphery of said coupler body and having an outer diameter and an inner diameter, wherein said inner diameter is larger than said outer diameter;

first and second snap rings disposed in said first and second tapered annular grooves, respectively;

at least one o-ring seated in a corresponding annular groove formed in said inner periphery of said coupler body inward of said first and second tapered annular grooves; and first and second coolant lines each having an end portion with a tapered end and a groove formed in each of their outer surfaces, said first and second coolant line end portions movable between an engaged position, wherein said end portions are disposed in said passageway such that said tapered end of said first coolant line end portion abuts said tapered end of said second coolant line end portion, and a disengaged position, wherein said first and second coolant line end portions are disposed outside of said passageway.

3. The union coupler assembly of claim 2 further comprising:

said first snap ring disposed in said first tapered annular groove and engaging said groove in said first coolant line end portion to thereby restrain said first coolant line end portion from moving toward said disengaged position; and said second snap ring disposed in said second tapered annular groove and engaging said groove in said second coolant line end portion to thereby restrain said second coolant line end portion from moving toward said disengaged position.

4. The union coupler assembly of claim 3 further comprising:

said first and second tapered annular grooves each having an outer wall lying perpendicular to said longitudinal axis wherein said first and second snap rings engage said outer walls in said first and second tapered annular grooves, respectively, to restrain said first and second coolant line end portions from moving from said engaged position toward said disengaged position.

5. The union coupler assembly of claim 2 further comprising:

said at least one o-ring sealingly engaging said first coolant line end portion with respect to said coupler body when said first coolant line end portion is in said engaged position; and said at least one o-ring sealingly engaging said second coolant line end portion with respect to said coupler body when said second coolant line end portion is in said engaged position.

6. The union coupler assembly of claim 2 further comprising:

said coupler body symmetrical with respect to a plane perpendicular to said longitudinal axis.

7. The union coupler assembly of claim 2 further comprising:

said first and second coolant line end portions fabricated from copper.

8. The union coupler assembly of claim 2 further comprising:

said first and second coolant line end portions fabricated from aluminum.

9. A union coupler assembly comprising:

a hollow, substantially cylindrical body coupler having a first end, a second end, and an inner periphery;

a first tapered annular groove formed in said inner periphery of said coupler body inward of said first end, said first tapered annular groove having an outer diameter and an inner diameter wherein said inner diameter is larger than said outer diameter;

a first snap ring disposed within said first tapered annular groove;

a first and second o-ring seated in a first and second annular groove, respectively, formed in said inner periphery of said coupler body inward of said first tapered annular groove;

a second tapered annular groove formed in said inner periphery of said coupler body inward of said second end, said second tapered annular groove having an outer diameter and an inner diameter wherein said inner diameter is larger than said outer diameter;

a second snap ring seated within said second tapered annular groove;

a third and fourth o-ring seated in a third and fourth annular groove, respectively, formed in said inner periphery of said coupler body inward of said second tapered annular groove;

a first coolant line end portion having an annular groove and a tapered end, and a second coolant line end portion having an annular groove and a tapered end, said first coolant line end portion and said second coolant line end portion movable between an engaged position, wherein said tapered end of said first coolant line end portion abuts said tapered end of said second coolant line end portion, and a disengaged position, wherein said tapered end of said first coolant line end portion is spaced apart from said tapered end of said second coolant line end portion;

said engaged position further characterized by said first snap ring seated in said annular groove in said first coolant line end portion and said second snap ring seated in said annular groove in said second coolant line end portion; and said engaged position further characterized by sealed engagement of said first o-ring and said second o-ring with said first coolant line end portion with respect to said coupler body and further characterized by sealed engagement of said third o-ring and said fourth o-ring with said second coolant line end portion with respect to said coupler body.

10. The union coupler assembly of claim 9 further comprising:

first, second and third longitudinal channels formed in said inner periphery of said coupler body, said first, second and third longitudinal channels extending between said first end and said first tapered annular groove, and said first, second, and third longitudinal channels adaptable to receive a tool capable of releasing said first snap ring from said annular groove in said first coolant line end portion; and fourth, fifth and sixth longitudinal channels formed in said inner periphery of said coupler body, said fourth, fifth and sixth longitudinal channels extending between said second end and said second tapered annular groove, and said fourth, fifth and sixth longitudinal channels adaptable to receive a tool capable of releasing said second snap ring from said annular groove in said second coolant line end portion.

11. The union coupler assembly of claim 10 further comprising:

said first and second coolant line end portions fabricated from copper.

12. The union coupler assembly of claim 10 further comprising:
said first and second coolant line end portions fabricated from aluminum.

13. A union coupler assembly, comprising:
a coupler body having a passageway extending therethrough;
first and second coolant line end portions movable between an engaged position, wherein said first and second cooling line end portions are disposed within said passageway and abut one another, and a disengaged position, wherein said first and second coolant line end portions are disposed outside of said passageway;
first and second retainer elements disposed within said coupler body and engageable with said first and second coolant line end portions, respectively, to prevent said first and second coolant line end portions from moving toward said disengaged position; and
first and second tapered annular grooves formed in said coupler body, wherein said first and second retainer elements are at least partially disposed within each of said first and second tapered annular grooves, respectively.

14. The union coupler assembly of claim 13 wherein said first and second retainer elements are snap rings.

* * * * *

UNITED STATES PATENT AND TRADEMARK OFFICE
CERTIFICATE OF CORRECTION

PATENT NO. : 7,273,237 B1  Page 1 of 1
APPLICATION NO. : 11/052482
DATED : September 25, 2007
INVENTOR(S) : Plattner It is certified that error appears in the above-identified patent and that said Letters Patent is hereby corrected as shown below:

In Col. 3, line 19, please delete "2, 4" and insert -- 2, and 4 --;

In Col. 3, line 55, please delete "groove" and insert -- grooves -- ;

In Col. 4, line 6, please delete "in coolant" and insert -- in the coolant --; and In Col. 6, line 15, please delete "grooves 84" and insert -- grooves 74, 84 --.

Signed and Sealed this

Fourth Day of December, 2007

JON W. DUDAS
*Director of the United States Patent and Trademark Office*